US007272363B1

(12) United States Patent
Fluker

(10) Patent No.: US 7,272,363 B1
(45) Date of Patent: Sep. 18, 2007

(54) HD DIGITAL RADIO COMBINING METHODS AND SYSTEMS

(76) Inventor: Stephen M. Fluker, 10413 Water Hyacinth Drive, Orlando, FL (US) 32825

( * ) Notice: Subject to any disclaimer, the term of this patent is extended or adjusted under 35 U.S.C. 154(b) by 410 days.

(21) Appl. No.: 10/817,283

(22) Filed: Apr. 2, 2004

Related U.S. Application Data

(60) Provisional application No. 60/542,566, filed on Feb. 6, 2004.

(51) Int. Cl.
*H04B 1/02* (2006.01)

(52) U.S. Cl. ...................... 455/91; 455/561; 455/127.1

(58) Field of Classification Search .................. 455/91, 455/3.01-3.06, 93, 561, 562.1, 127.1, 127.5; 375/260, 295, 296
See application file for complete search history.

(56) References Cited

U.S. PATENT DOCUMENTS 5,875,396 A * 2/1999 Stockton et al. ......... 455/562.1
5,894,497 A * 4/1999 Overton ....................... 455/91
6,005,894 A * 12/1999 Kumar ....................... 375/296
6,898,249 B2 * 5/2005 Kroeger et al. ............. 375/260
7,043,215 B2 * 5/2006 Toporski et al. .............. 455/93
7,068,937 B1 * 6/2006 Combs et al. ............. 455/3.01
7,110,727 B2 * 9/2006 Dekker ........................ 455/91
2004/0219889 A1 * 11/2004 Honcharenko ............... 455/91
2005/0190851 A1 * 9/2005 Cabrera ...................... 375/295
2006/0017521 A1 * 1/2006 Downs ........................ 455/91

* cited by examiner

*Primary Examiner*—Lana Le
(74) *Attorney, Agent, or Firm*—Brian S. Steinberger; Joyce P. Morlin; Law Offices of Brian S. Steinberger, P.A.

(57) ABSTRACT

Mid-level combining methods and systems that combine benefits of high level and low level combining methods for generating HD (High Definition) radio signal outputs. The High level IBOC combining technique combines the RF outputs of an analog transmitter with an IBOC transmitter operating in a combined digital/analog mode, and can include a properly phased, identical, analog component of the signal feeding the analog transmitter. The low level combining technique includes splitting and phase adjustment for the purpose of feeding the analog signal simultaneously to an analog transmitter and an IBOC digital transmitter operating in a combined digital/analog mode. The mid-level combining method and system uses attributes of the high and low level methods and systems. Another mid-level combining method and system is for high transmitter power output (TPO). Additional methods and systems for converting existing transmitter room spaces to HD (High Definition) radio transmitters, without having to add onto existing rooms and buildings.

12 Claims, 7 Drawing Sheets

HD DIGITAL RADIO COMBINING METHODS AND SYSTEMS

This invention claims the benefit of priority to United States Provisional Application Ser. No. 60/542,566 filed Feb. 6, 2004.

FIELD OF INVENTION

This invention relates to digital communications, in particular to methods and systems for combining signals from digital and analog transmitters to produce combined HD (High Definition) radio signals.

BACKGROUND AND PRIOR ART

HD radio is the combination of a traditional analog signal with a mixed digital audio stream. The digital audio stream is typically produced separately from the analog via a linear solid-state transmitter. The output of this digital transmitter is then combined with the output of the original analog transmitter (tube type or solid state). From the beginning of this technology the challenge has been to develop an efficient method to combine these two signals.

The current and typical transmitter used today is not able to carry both the analog and digital signals at the same time. The digital signal requires additional bandwidth, which must be linear to pass the two signals. Traditional tube type transmitters are not capable of passing this type of signal without severely overheating. Newer solid-state transmitters can be modified to pass both signals simultaneously, however the maximum amount of power capable from these transmitters is still very limited because of the high cost. Other methods of transmitting both signals had to be found for stations needing high power outputs.

The first obvious method was to use two transmitters, one for the digital signal, and one for the analog. Combining two transmitters works well when the outputs of both transmitters are in phase with each other and of equal power. In HD combining, the digital signal is much lower in power, and not locked in phase with the analog signal. This creates a "mis-match" problem resulting in high amounts of wasted power. The current methods of combining are briefly described below.

High Level Combining (Separate Amplification) is Shown in FIG. 1(Prior Art)

Referring to FIG. 1, the output of the "main" Analog transmitter 2 is combined through a 10 dB (decibel) hybrid combiner 4 with the output of the Linear Digital transmitter 6.

The program audio is transmitted to the tower site (not shown) via a linear AES digital STL 8 and fed into an In Band On Channel (IBOC) exciter 10. Audio from IBOC exciter 10 is looped through the digital processor 12 to tailor the sound for the digital transmission. The exciter 10 also sends out a delayed AES stream 14 to feed the Analog Signal Audio Processor 16, which in turn feeds the input of the Analog Exciter 18.

Each of the two exciters (IBOC 10 and Analog 18) have very low power radio frequency (RF) outputs which feed the appropriate transmitters. The purpose of the transmitters is to amplify the low power of the exciter output into the high power output needed to broadcast through the antenna 20. This power level can commonly be 15,000 to 50,000 watts. The outputs of the two transmitters are then connected through a combiner hybrid 4. The main output feeds the antenna. In any combining system like this there is some of the signal that does not get to the antenna. It can be thought of as backpressure through a water hose. To prevent this back pressure from damaging the transmitter, a "release valve" or reject port 22 is used to channel this lost power into a resistive or reject load 24 which absorbs the power and converts it into heat.

The down side of this High Level combining method is low efficiency. In this arrangement, 10% of the RF signal from the Analog transmitter 2 is lost and sent to the reject load 24, while 90% of the RF signal of the IBOC transmitter 6 is lost into this same load. To compensate for the power losses, the output of the Analog transmitter 2 must be increased. This can be a hardship for a station owner if this transmitter is already operating at maximum power. The transmitter would have to be replaced with a higher power model. Also, because of the inefficiency, the electric power consumption will increase dramatically increasing the monthly power bills.

The placement of the reject load 24 must also be considered. If placed inside of the building, the heat dissipation will be such that the heating, ventilation and air conditioning (HVAC) system will need to be re-evaluated. In many cases, new larger air conditioners will be necessary to overcome the heat produced. Another option would be to purchase a reject load capable of being placed outside to remove the heat from the room. This installation would incur additional costs to cut and seal holes through the outside wall of the building, and possibly to pour a cement pad to place the reject load on. Fencing would also be recommended as the heat and RF energy in the reject load could be considered dangerous to touch.

Low Level Combining (Common Amplification) is Shown in FIG. 2 (Prior Art).

FIG. 2 shows a much more efficient version of HD radio transmission and is used when the total amount of power needed from the system is low. As in the High Level combining system, the digital audio 30 is fed into both the digital exciter 32 and analog exciter 34. Since a single affordable solid-state transmitter can accommodate the total power output necessary, the combining in a low-level combiner 36 can actually take place at the outputs of the exciters. While there are similar losses still, they exist in power levels of 50 watts or less and are insignificant. The combined analog/digital signal 38 is then fed into the solid state, linear transmitter 40 where the power can be amplified to power levels around 7,000 watts.

While this version is much more efficient and eliminates the high power losses going into a reject load, the output power levels are very restricted. For stations operating with transmitter power outputs (TPO) of 7 kW and under, this method is very attractive. Unfortunately most FM radio stations operate with much higher TPO's and the solid-state transmitters to accomplish this become extremely expensive, and for the most part not cost effective.

There is another prior art technique of combining currently proposed that utilizes two separate antennas as shown in FIG. 3. The method in FIG. 3 has just been approved for use by the Federal Communications Commission (FCC). The FIG. 3 embodiment allows the two signals (Analog 50 and Digital 52) to combine in free air space. It is efficient in that no power is lost, however it requires a second antenna 54 to be installed on the tower which will cost in tower space rental, and in many cases, the extra space is not available.

There will also be a difference in signal coverage between the two signals as the two antennas are not in the same location on the tower.

Thus, the need exists for solutions to the above problems with the prior art.

SUMMARY OF THE INVENTION

A primary objective of the present invention is to provide methods and systems for increasing the efficiency of HD (High Definition) digital radio transmitters by combining an analog transmitter with a digital transmitter.

A secondary objective of the present invention is to provide methods and systems for reducing the energy costs of HD digital radio transmitters by combining an analog transmitter with a digital transmitter.

A third objective of the present invention is to provide for methods and systems for using existing transmitter room spaces for HD digital radio transmitters without additional labor, construction and costs to add onto the existing transmitter room spaces.

A fourth objective of the present invention is to provide for methods and systems for producing cost-effective high transmitter power output (TPO) in HD digital radio transmitters.

A fifth objective of the present invention is to provide methods and systems for converting AM and FM radio stations from analog to digital transmission.

A sixth objective of the present invention is to provide methods and systems for generating HD signals for radio transmission from stations with transmitter power output between approximately 5,000 watts and approximately 35,000 watts.

A seventh objective of the present invention is to provide methods and systems for generating efficient HD signals while energy costs are lowered.

An eighth objective of the present invention is to provide methods and systems for extending radio transmitter tube life by lowering the output power of the analog transmitter.

Various mid-level combining methods and systems are described for economically combining high and low levels of analog and digital outputs. The sound quality achieved by radio stations is highly desired and static-free.

Preferred embodiments of methods and systems for generating HD(High Definition) digital radio signals can include combining signals from a transmitter having both digital and analog carriers output, with a separate analog transmitter having an analog output, whereby the digital and analog carriers outputs of the Linear Solid State IBOC transmitter are combined with the analog output of the separate analog transmitter. The transmitter with both digital and analog carrier outputs can be a Linear Solid State IBOC transmitter, and the combiner can include a 3 dB combiner.

Other embodiments can include combining methods and systems for high transmitter power output (TPO).

The novel invention allows for more efficient methods and systems for converting analog radio stations to HD digital radio stations that have lower energy costs than current methods and systems for generating HD digital radio signals. The novel methods and systems can increase existing tube life spans of the analog transmitters. The novel conversion methods and systems require no extra building space in the existing radio stations since they are able to use existing HVAC systems. Further, the invention embodiments have lower energy operating costs than existing conversion techniques.

Further objects and advantages of this invention will be apparent from the following detailed description of the presently preferred embodiments, which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation. Acronyms used throughout this invention are defined as follows:

HD refers to High Definition Radio, which is the name used for Digital Radio AES refers to the professional standard format used for digital audio. (Audio Engineering Society)

dB refers to decibel

HVAC refers to heating, ventilating and air conditioning

IBOC refers to (In Band On Channel) and is the accepted and licensed method to produce digital radio in the US. The digital data is carried on the standard AM and FM bands and is encoded on the same frequency or channel allocation as the current main channel radio station.

RF refers to radio frequency.

STL refers to (Studio to Transmitter Link) refers to the method to get the program audio of the radio station from the studio to the transmitter. It can be via microwave link, satellite, or telephone lines.

TPO refers to transmitter power output.

NOVEL MID-LEVEL COMBINING EMBODIMENT

Figure 4:
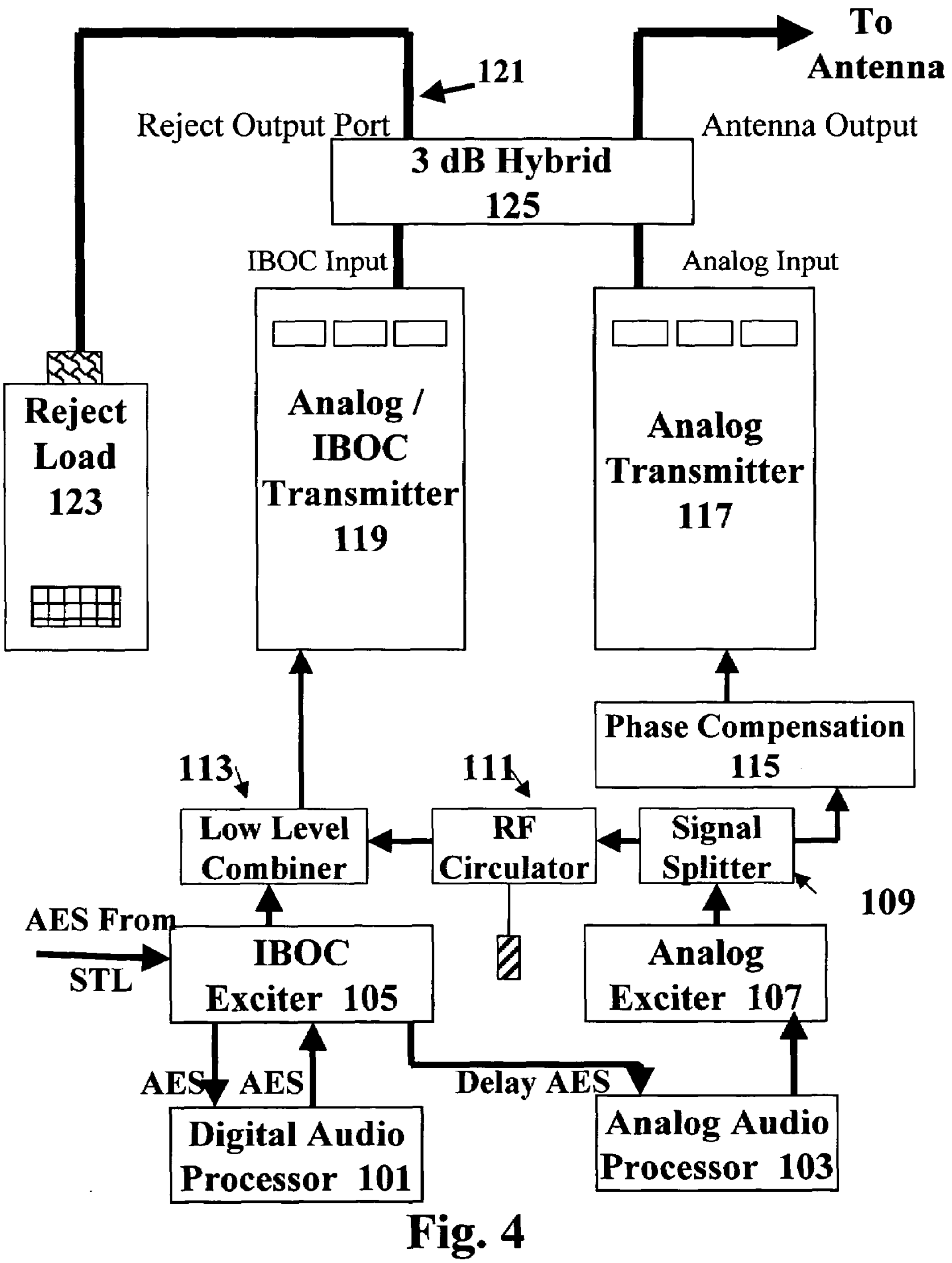
FIG. 4 shows a novel mid level combining embodiment, which optimally combines the embodiments of the previous figures.

The embodiment shown in FIG. 4 takes the pros of both systems of high level combining and low level combining and produces a much more efficient method and system of producing higher power TPO's, and can eliminate the need for an old Analog transmitter operating at maximum power and ready to be replaced.

In general, the efficiency problems with traditional methods stem from such a difference in the signal outputs of the two transmitters. This mid-level combining method and system utilizes the benefits of combining the signals at the exciter level to bring both transmitters to a similar power level. This allows the use of existing 3 dB combining hybrids to dramatically improve the efficiency of the overall system.

Audio is fed into the system the same as in the prior art systems. The difference comes in the output of the two exciters. As in the Low Level method, the output of both the IBOC exciter 105 and the Analog exciter 107 are combined. The output of the Analog Exciter 107 however, is first fed into a simple "T" type coaxial splitter 109.

One output of the splitter 109 is fed into a circulator 111, then to the low level combiner 113. The purpose of the circulator 111 is to allow the analog RF signal to pass through and into the combiner 113, while preventing a back-flow of the Digital IBOC Exciter 105 from backing up into the Analog Transmitter 117 which would cause severe heating. The second output of the splitter 109 is then fed to the Analog Transmitter 117 with a phase compensation device 115 to correct and compensate for phasing errors between the two transmitter outputs. This phase compensation device 115 will allow adjustment of the timing of the signal entering the analog transmitter 117 so that it can exactly match the timing through the digital transmitter 119. It is important to have the phase timing of both transmitter outputs to be the same so that the amplitude of both signals add together to produce the high power output. Any mismatch in the timing will cause the two signals to begin to cancel each other out, thus send wasted power to the reject port 121 and reject resistive power load 123.

Figure 1:
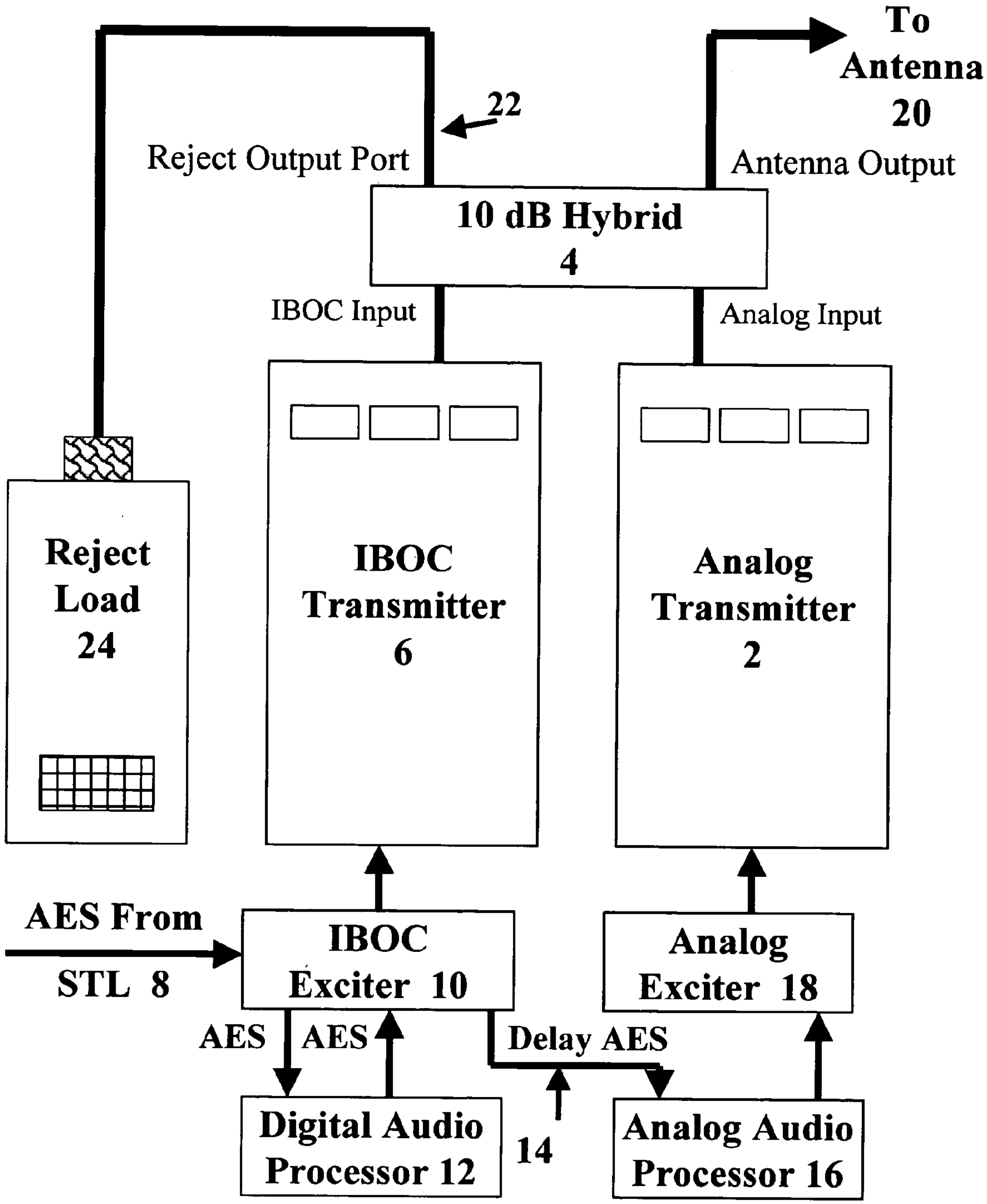
Fig. 1 (Prior Art)
FIG. 1 shows a prior art view of a high level combining layout for combining the output of the "main" Analog transmitter through a hybrid combiner with the output of the linear digital transmitter.

Comparing the prior art layouts with the novel embodiment is as follows:

In the High Level Combining system (FIG. 1), the output of the Linear Solid State IBOC transmitter 6 contains ONLY the Digital signal, and the output of the Analog Transmitter 2, ONLY the Analog component.

Figure 2:
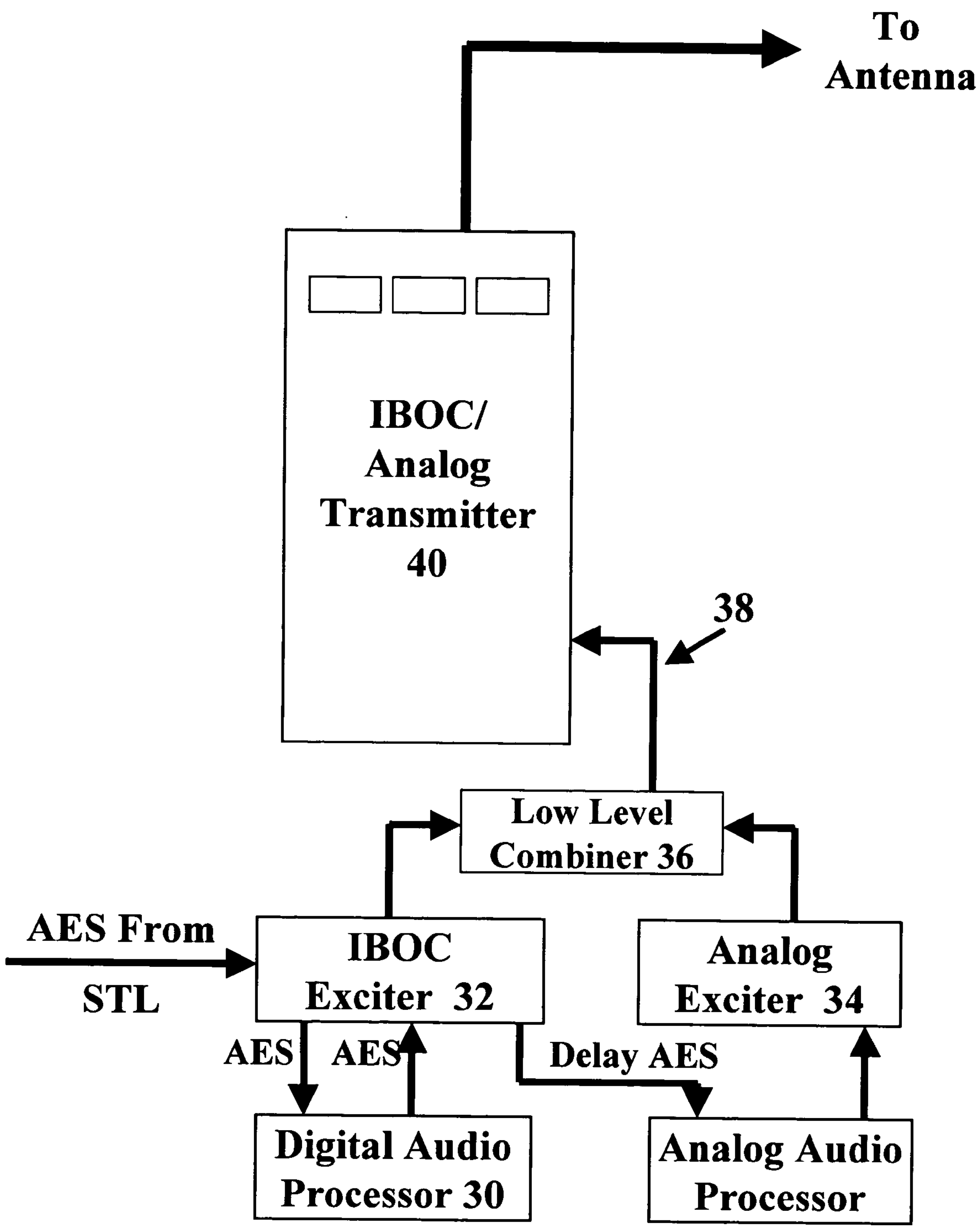
Fig. 2 (Prior Art)
FIG. 2 shows a prior art view of a low level combining layout for combining the analog and digital signals at the exciter level, which are fed into a single linear solid state transmitter.
Figure 3:
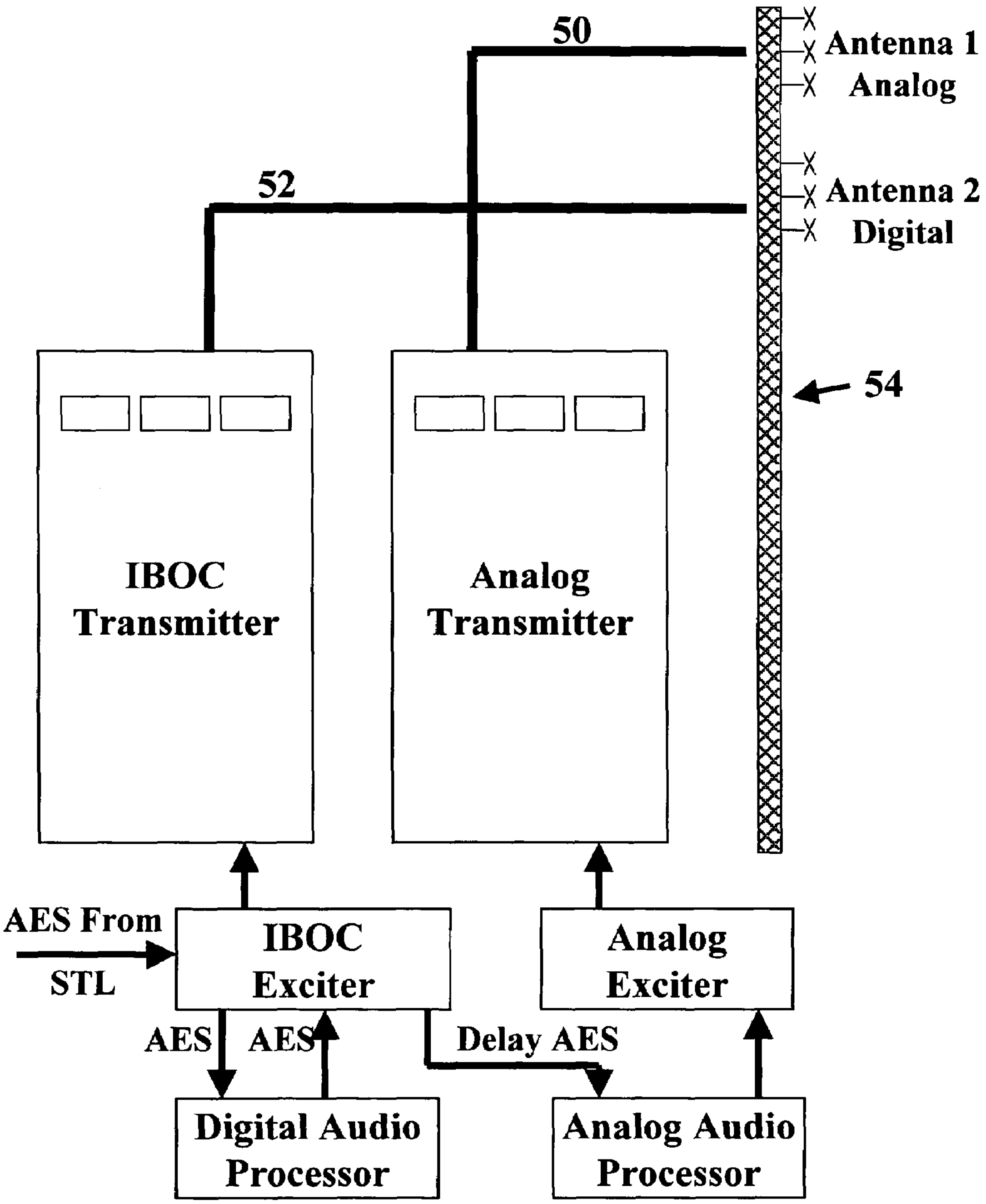
Fig. 3 (Prior Art)
FIG. 3 shows another prior art view of a combining layout in free-air space.

In the Low Level Combining system (FIG. 2), the output of the Linear Solid State IBOC transmitter 40 contains both the Digital and Analog Carriers, and there is no other transmitter used.

In the Mid-Level Combining system of the present invention (FIG. 4), the output of the Linear Solid State IBOC transmitter 119 contains both the Digital and Analog carriers, yet there is still a separate Analog transmitter 117. By utilizing the Analog capability of the IBOC transmitter 119, a higher level Analog/Digital mix output is achieved and can now be combined using traditional 3 dB Hybrid combiners 125 which can combine the two signals with little or no losses into the reject load 123.

NOVEL MID-LEVEL COMBINING FOR HIGH TPO

Figure 5:
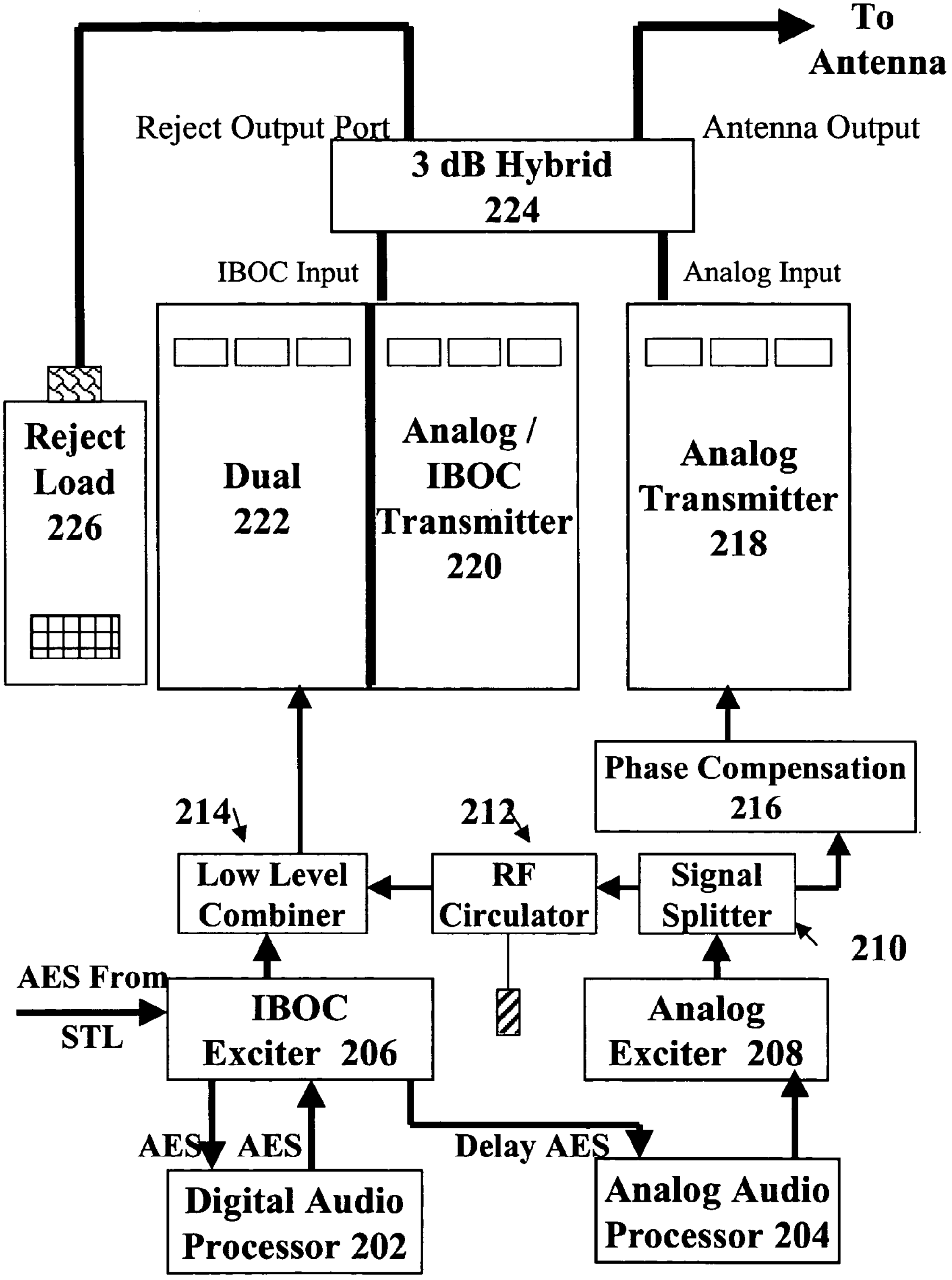
FIG. 5 shows another embodiment of a mid-level combining embodiment for high transmitter power output (TPO).

The embodiment shown in FIG. 5 shows mid-level combining for high transmitter power output (TPO). The configuration is suitable for higher power radio stations with transmitter power outputs over 25,000 watts.

As in the previous novel mid-level combining system disclosed in FIG. 4, the output of the IBOC exciter 206 and the Analog exciter 208 are combined. The output of the Analog exciter 208 is first fed into a simple "T" type coaxial splitter 210.

One output of the splitter 210 is fed into a circulator 212, then to the low level combiner 214. The circulator 212 allows the analog RF signal to pass through and into the combiner 214, while preventing a back-flow of the Digital IBOC exciter 206 from backing up into the Analog transmitter 218 and causing severe heating. The second output of the splitter 210 is then fed to the Analog transmitter 218 with a phase compensation device 216 to correct and compensate for phasing errors between the two transmitter outputs. The phase compensation device 216 will allow adjustment of the timing of the signal entering the analog transmitter 218, so that it can exactly match the timing through the dual analog/IBOC transmitters 220 and 222. In the side by side configuration of transmitters 220 and 222 in FIG. 5, each dual Analog/IBOC transmitter produces up to 7,000 watts and are combined to give a total of up to 14,000 watts of Analog/IBOC Digital signal. The Analog/IBOC Digital signal is then combined with the analog transmitter to accommodate output powers from approximately 25,000 watts up to approximately 35,000 watts. While the cost of the Dual Transmitter is high, the same dual transmitter is required for higher power radio stations to produce the IBOC Only signals required, thus the cost is comparable.

Figure 6A:
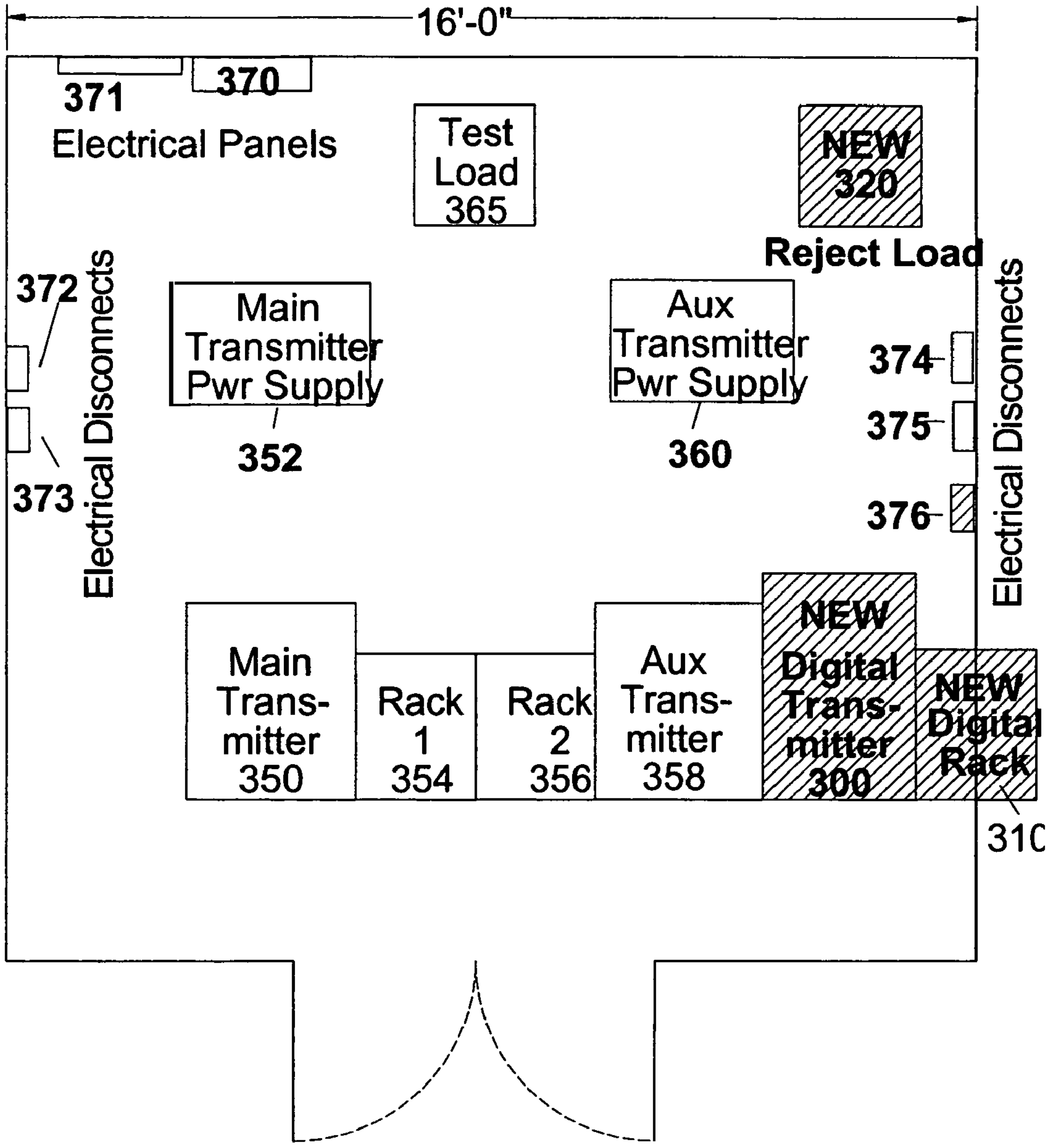
FIG. 6A shows an existing transmitter room being modified for high level combining applications of the prior art where additional room space must be added thereon.
Figure 6B:
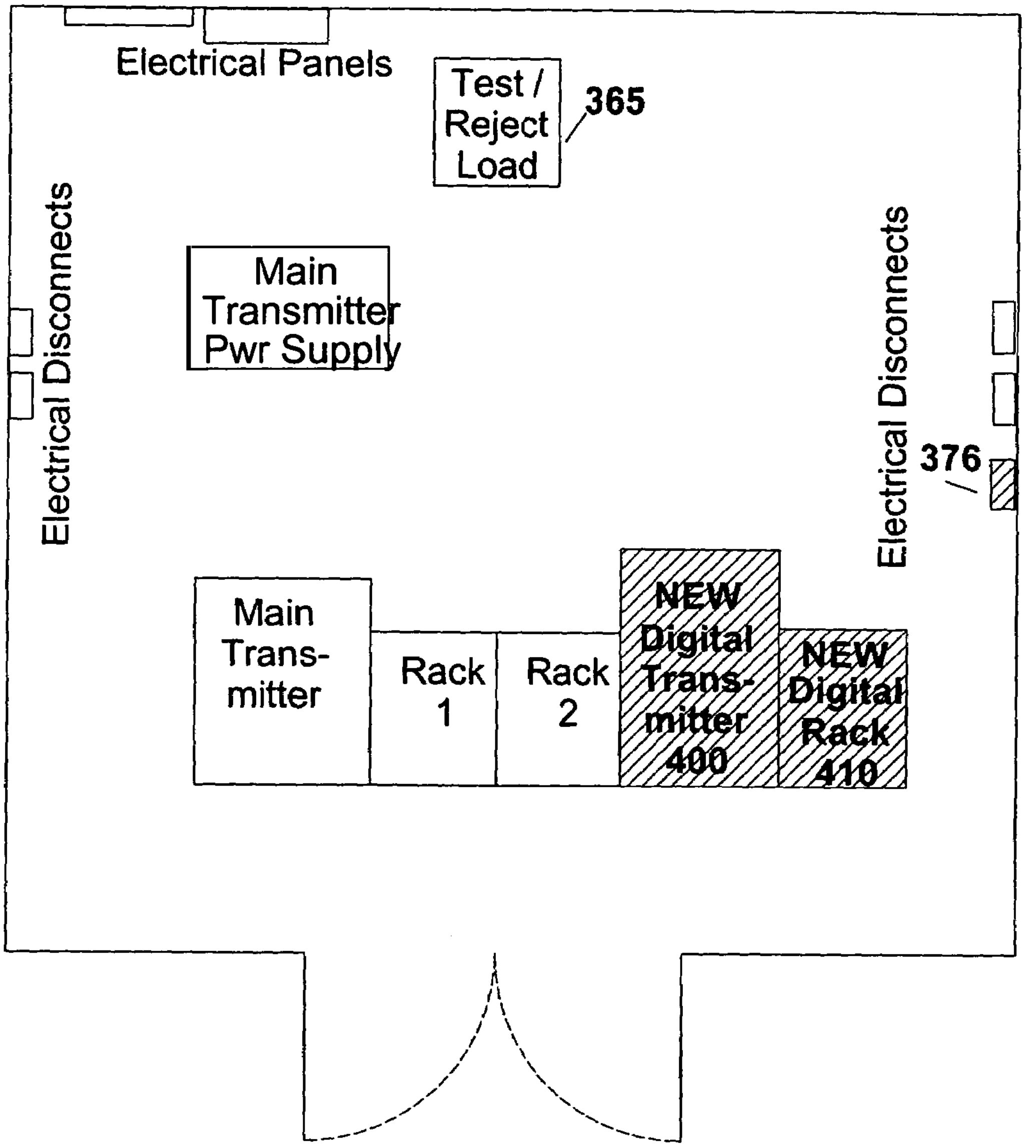
FIG. 6B shows an existing transmitter room being modified for the mid level combining invention without needing additional space.

FIGS. 6A and 6B provide information on the space saving features of the present invention. Transmitter facilities are not known for being spacious. FIG. 6A shows the space restrictions in a typical transmitter building having equipment that includes a main transmitter 350, a main transmitter power supply 352, two racks 354 and 356, an auxiliary transmitter 358, a corresponding auxiliary transmitter power supply 360, and a test load 365. Electrical panels 370 and 371 are positioned around the perimeter of the room as are several electrical disconnect boxes 372, 373, 374, 375, 376 which are safety features. Conventional High Level Combining requires an additional transmitter 300 and equipment rack 310 to be installed. In many cases, as shown in FIG. 6A, there is no physical room for the added equipment, forcing either building enlargement, or even a building replacement.

Referring now to FIG. 6B, when using the Mid-Level Combining method of the present invention, the new transmitter 400 produces both Analog and Digital signals and can thus be used as the Auxiliary Transmitter 358 (shown in FIG. 6A). The old Auxiliary Transmitter 358 (FIG. 6A), can then be removed, even sold to help offset the cost of the new equipment. FIG. 6B shows how the new equipment including a Digital Transmitter 400, a Digital Rack 410 and an electrical disconnect 420 fit in the transmitter room when using the Mid-Level Combining method of the present invention. With the configuration in FIG. 6B, there is no need for an additional Test/Reject Load since the existing Test Load will serve as the new Reject Load 365 (shown in FIG. 6A). Additional space is even created since the new transmitter will not have a separate power supply.

EXAMPLES

First Example of Mid Level Combining: For this example we will use a station with a TPO of 14 kW, Using a 15 kW Transmitter.

Low Level Combining with a single transmitter is difficult but can be achieved by combining two solid-state transmitters, however the cost of the equipment is extremely high.

High Level Combining is possible. To accomplish this level of combining, the Analog transmitter power will need to be increased to approximately 15.4 kW to overcome the losses, which will end up in the reject load (this pushes the capable power limit of this transmitter). A Digital signal in this case would be approximately 140 watts, but with the inefficiency of the combining system, a transmitter output of approximately 1,400 watts must be used. Approximately 2,660 watts of power will be lost and pumped into the reject load. This is wasted electricity, and wasted air conditioning to overcome the heat output.

In the Low Level Combining system (FIG. 2), the output of the Linear Solid State IBOC transmitter 40 contains both the Digital and Analog Carriers, and there is no other transmitter used.

In the Mid-Level Combining system of the present invention (FIG. 4), the output of the Linear Solid State IBOC transmitter 119 contains both the Digital and Analog carriers, yet there is still a separate Analog transmitter 117. By utilizing the Analog capability of the IBOC transmitter 119, a higher level Analog/Digital mix output is achieved and can now be combined using traditional 3 dB Hybrid combiners 125 which can combine the two signals with little or no losses into the reject load 123.

"Mid-Level" Combining would be the choice in this case. Utilizing a cost effective Linear Solid State transmitter, a combined IBOC/Analog signal can be created with a TPO of approximately 7 kW. Now, take the Analog transmitter and reduce its output from 14 kW down to approximately 7 kW. Combine the output of both transmitters via a standard hybrid and the results will be approximately 14,000 watts of Analog with the 140 watt Digital component, with no lost power into the reject load. The tube type analog transmitter will now be "loafing" which will dramatically increase the tube life. Because of the elimination of the wasted power to the reject load, the total output power needed will also be reduced by approximately 17% representing a significant savings on the electric bill every month.

The analog transmitter will not need to be replaced, nor will the HVAC amounts need to be adjusted. Yet another benefit is built in redundancy. Should the older analog transmitter fail, the newly added solid-state transmitter will now have an analog component to it keeping the station on the air at reduced power. By utilizing "switchless" combining methods the station could remain on the air at approximately 50% power until the analog transmitter is repaired. Should the solid-state transmitter fail the radio station would remain on the air in the analog mode only at this time with no HD radio back up. People listening with HD Radios would not notice much, as their radio would blend into the analog mode and they may not even notice that the station is in trouble.

Should a higher TPO be necessary, the analog transmitter's power can be increased to achieve this power. As the power is increased however, there will become a mis-match of the power levels of the two transmitters, which will result in an increase in power being fed to the reject load. In initial tests, a TPO of approximately 17 to approximately 20 kW can be achieved before this mismatch creates a significant power level to the reject load. If money is available, a pair of the Linear Solid State Transmitters can be combined and this output combined with the analog transmitter to achieve higher power levels in the approximately 28 to approximately 35 kW TPO levels. However, the cost for the dual Solid State transmitters is high. For a TPO above the approximately 35 kW power level use of the traditional high-level combining may still be the choice method.

Testing

The mid level combining invention was initially tested on Oct. 20, 2003, by combining testing using the WHTQ transmitter system. WHTQ uses two transmitters, each running at approximately 17,000 watts combined to produce a total power output of approximately 34,000 watts. This system is set up with a traditional combining method for two like Analog transmitters. The transmitter arrangement of the present invention is similar, however one of the two transmitters would have the Digital component in its output.

Testing Objective: To see how much of a mis-match in power levels the standard 3 dB hybrid combiner can take before a significant amount of power is directed to the reject load and lost.

First Test: The power of Transmitter 1 is adjusted to approximately 7,000 watts to simulate the Analog/IBOC combined transmitter in the Mid Level combining system. Transmitter 2 is then adjusted and tuned to approximately 7,000 watts as well to produce a total of approximately 14,000 watts. In this exact match, no power goes to the reject load. Next, the power of Transmitter 2 is turned up, touching up the tuning to keep the power to the reject load nulled, and is continued to increase the power of transmitter 2 until the power level to the reject load begins to climb significantly.

Results of First Test: It was determined that the output of transmitter 2 could be increased significantly before the power to the reject load became so high that the benefits of this combining method over traditional "High Level Combining" were insignificant. It was determined that the total combined output power can approach approximately 18,000 watts before power levels began to climb, and as much as approximately 23,000 watts before the High Level Combining became more efficient.

Second Test: The power of Transmitter 1 is increased to approximately 14,000 watts. This test is to simulate using two Solid State Digital Transmitters combined.

Results of Second Test: It was determined that the combined transmitter system using the Mid Level Combining scheme could easily produce approximately 28,000 to approximately 30,000 watts with virtually no lost power to the reject load. The power can be increased to approximately 35,000 watts and still have good efficiency.

Conclusions:

Using the Mid Level Combining method, radio stations with Transmitter Power Output requirements up to approximately 18,000 watts would clearly benefit. Power levels above that and up to approximately 35,000 watts could be achieved with a higher start-up cost, but could still recover the expenses in operating costs over a period of a few months or years.

Calculations:

Below are calculations of the monthly savings which can be realized by a radio station utilizing the Mid Level combining methods and systems. These calculations of the power usage are based on the following criteria:

| | |
|---|---|
| Efficiency of a typical Analog Transmitter: | 76% |
| Efficiency of a Solid State Transmitter operating in an IBOC Only mode, such as with high level combining: | 21% |
| Efficiency of a Solid State Transmitter operating in Low Level Combining (common amplification): | 53% |

A discussion of the actual cost to implement vs. cost savings will be discussed after the data. U.S. Dollar costs are based on prices in year 2004.

TABLE 1

A radio station with a transmitter power output of 7,000 watts. At this power level the radio station could chose any of the combining methods.

| | Analog Transmitter | IBOC Only Transmitter | Combined Transmitter | Total Monthly Electric Bill | Savings |
|---|---|---|---|---|---|
| Normal Analog Mode | | | | | |
| Transmitter Output Power (Watts) | 7,000.00 | 0 | 0 | | |
| Efficiency (%) | 76% | 21% | 53% | | |
| Energy Draw (Watts) | 9,211 | 0 | 0 | | |
| Monthly Operating Expense | $699 | $0 | $0 | $699 | |
| Low Level Combining | | | | | |
| Transmitter Output Power (Watts) | 0.00 | 0 | 7000 | | |
| Efficiency (%) | 76% | 21% | 53% | | |
| Energy Draw (Watts) | 0 | 0 | 13,208 | | |
| Mo. Operating Expense | $0 | $0 | $1,002 | $1,002 | $152 |
| High Level Combining | | | | | |
| Transmitter Output Power (Watts) | 7,777.78 | 700 | 0 | | |
| Efficiency (%) | 76% | 21% | 53% | | |
| Energy Draw (Watts) | 10,234 | 3,333 | 0 | | |
| Monthly Operating Expense | $777 | $253 | $0 | $1,030 | $179 |
| Mid Level Combining | | | | | |
| Transmitter Output Power (Watts) | 3,500.00 | 0 | 3500 | | |
| Efficiency (%) | 76% | 21% | 53% | | |
| Energy Draw (Watts) | 4,605 | 0 | 6,604 | | |
| Monthly Operating Expense | $349 | $0 | $501 | $851 | |

The savings column represents the amount saved each month utilizing the Mid Level Combining methods and systems, over the traditional methods. In Table 1, the Mid Level Combining method would realize a $152 per month cost savings over the Low Level Combining Method, and a $179 cost savings over the High Level Combining method.

TABLE 2

A radio station with a transmitter power output of 15,000 watts. With this power level, the low level combining is not cost effective.

| | Analog Trans-mitter | IBOC Only Trans-mitter | Com-bined Trans-mitter | Total Monthly Electric Bill | Savings |
|---|---|---|---|---|---|
| Normal Analog Mode | | | | | |
| Transmitter Output Power (Watts) | 14,000 | 0 | 0 | | |
| Efficiency (%) | 76% | 21% | 53% | | |
| Energy Draw (Watts) | 18,421 | 0 | 0 | | |
| Monthly Operating Expense | $1,398 | $0 | $0 | $1,398 | |
| High Level Combining | | | | | |
| Transmitter Output Power (Watts) | 15,556 | 1400 | 0 | | |
| Efficiency (%) | 76% | 21% | 53% | | |
| Energy Draw (Watts) | 20,468 | 6,667 | 0 | | |
| Monthly Operating Expense | $1,553 | $506 | $0 | $2,059 | $358 |
| Mid Level Combining | | | | | |
| Transmitter Output Power (Watts) | 7,000 | 0 | 7000 | | |
| Efficiency (%) | 76% | 21% | 53% | | |
| Energy Draw (Watts) | 9,211 | 0 | 13,208 | | |
| Monthly Operating Expense | $699 | $0 | $1,002 | $1,701 | |

In Table 2, a radio station would realize a $358 per month power bill reduction by using the Mid Level Combining method over the High Level method.

TABLE 3

A radio station with a transmitter power output of 20,000 watts.

| | Analog Transmitter | IBOC Only Transmitter | Combined Transmitter | Total Monthly Electric Bill | Savings |
|---|---|---|---|---|---|
| Normal Analog Mode | | | | | |
| Transmitter Output Power (Watts) | 20,000 | 0 | 0 | | |
| Efficiency (%) | 76% | 21% | 53% | | |
| Energy Draw (Watts) | 26,316 | 0 | 0 | | |
| Monthly Operating Expense | $1,997 | $0 | $0 | $1,997 | |
| Tube Expense Est./Month | $97 | | | | |
| High Level Combining | | | | | |
| Transmitter Output Power (Watts) | 22,222 | 2000 | 0 | | |
| Efficiency (%) | 76% | 21% | 53% | | |
| Energy Draw (Watts) | 29,240 | 9,524 | 0 | | |
| Monthly Operating Expense | $2,219 | $723 | $0 | $2,942 | $641 |
| Mid Level Combining | | | | | |
| Transmitter Output Power (Watts) | 13,000 | 0 | 7000 | | |
| Efficiency (%) | 76% | 21% | 53% | | |
| Energy Draw (Watts) | 17,105 | 0 | 13,208 | | |
| Monthly Operating Expense | $1,298 | $0 | $1,002 | $2,300 | |

In Table 3, the radio station would realize a monthly power bill reduction of approximately $641.

TABLE 4

A radio station with a transmitter power output of 25,000 watts.

| | Analog Transmitter | IBOC Only Transmitter | Combined Transmitter | Total Monthly Electric Bill | Savings |
|---|---|---|---|---|---|
| Normal Analog Mode | | | | | |
| Transmitter Output Power (Watts) | 25,000 | 0 | 0 | | |
| Efficiency (%) | 76% | 21% | 53% | | |
| Energy Draw (Watts) | 32,895 | 0 | 0 | | |
| Monthly Operating Expense | $2,496 | $0 | $0 | $2,496 | |
| High Level Combining | | | | | |
| Transmitter Output Power (Watts) | 27,778 | 2,500 | 0 | | |
| Efficiency (%) | 76% | 21% | 53% | | |
| Energy Draw (Watts) | 36,550 | 11,905 | 0 | | |
| Monthly Operating Expense | $2,774 | $903 | $0 | $3,677 | $678 |
| Mid Level Combining | | | | | |
| Transmitter Output Power (Watts) | 20,000 | 0 | 7,000 | | |
| Efficiency (%) | 76% | 21% | 53% | | |
| Energy Draw (Watts) | 26,316 | 0 | 13,208 | | |
| Monthly Operating Expense | $1,997 | $0 | $1,002 | $2,999 | |

In Table 4, the radio station would realize a monthly power bill reduction of approximately $678.

TABLE 5

A radio station with a transmitter power output of 30,000 watts.

| | Analog Transmitter | IBOC Only Transmitter | Combined Transmitter | Total Monthly Electric Bill | Savings |
|---|---|---|---|---|---|
| Normal Analog Mode | | | | | |
| Transmitter Output Power (Watts) | 30,000 | 0 | 0 | | |
| Efficiency (%) | 76% | 21% | 53% | | |
| Energy Draw (Watts) | 39,474 | 0 | 0 | | |
| Monthly Operating Expense | $2,996 | $0 | $0 | $2,996 | |
| High Level Combining | | | | | |
| Transmitter Output Power (Watts) | 33,333 | 3000 | 0 | | |
| Efficiency (%) | 76% | 21% | 53% | | |
| Energy Draw (Watts) | 43,860 | 14,286 | 0 | | |
| Monthly Operating Expense | $3,328 | $1,084 | $0 | $4,413 | $810 |
| Mid Level Combining | | | | | |
| Transmitter Output Power (Watts) | 16,000 | 0 | 14000 | | |
| Efficiency (%) | 76% | 21% | 53% | | |
| Energy Draw (Watts) | 21,053 | 0 | 26,415 | | |
| Monthly Operating Expense | $1,598 | $0 | $2,005 | $3,602 | |

In Table 5, the radio station would realize a monthly power bill reduction of approximately $810.

TABLE 6

A radio station with a transmitter output of 35,000 watts.

| | Analog Transmitter | IBOC Only Transmitter | Combined Transmitter | Total Monthly Electric Bill | Savings |
|---|---|---|---|---|---|
| Normal Analog Mode | | | | | |
| Transmitter Output Power (Watts) | 35,000 | 0 | 0 | | |
| Efficiency (%) | 76% | 21% | 53% | | |
| Energy Draw (Watts) | 46,053 | 0 | 0 | | |
| Monthly Operating Expense | $3,495 | $0 | $0 | $3,495 | |
| High Level Combining | | | | | |
| Transmitter Output Power (Watts) | 38,889 | 3500 | 0 | | |
| Efficiency (%) | 76% | 21% | 53% | | |
| Energy Draw (Watts) | 51,170 | 16,667 | 0 | | |
| Monthly Operating Expense | $3,883 | $1,265 | $0 | $5,148 | $947 |
| Mid Level Combining | | | | | |
| Transmitter Output Power (Watts) | 22,000 | 0 | 14000 | | |
| Efficiency (%) | 76% | 21% | 53% | | |
| Energy Draw (Watts) | 28,947 | 0 | 26,415 | | |
| Monthly Operating Expense | $2,197 | $0 | $2,005 | $4,201 | |

In Table 6, the radio station would realize a monthly power bill reduction of approximately $947.

Power levels above 35,000 watts would need further testing to determine what, if any, cost savings would be realized.

Implementation vs. Operating Cost Comparisons:

The following examples outline the major costs involved in converting an existing radio station to digital, comparing the cost for the traditional combining methods, and the developing Mid Level Combining method. Additionally, amonthly savings is listed in the following cases for the extension of the transmitter tube life. By lowering the output power of the analog transmitter, the life of the tube is extended considerably. Tubes are a substantial recurring cost incurred by radio stations.

Case 1: Radio station operating at 7,000 Watts TPO.

Typically a radio station like this would be operating a 10,000 Watt Main Transmitter. The radio station could then easily operate under the Low Level Combining method, but could still find savings by using the new Mid Level combining.

| | Low Level | Mid Level |
|---|---|---|
| Analog Transmitter Cost: | $0 | $0 |
| Digital Transmitter Cost: | $88,000 | $88,000 |
| Digital Exciter Cost: | $33,000 | $33,000 |
| 10 dB High Level Combiner | $0 | $0 |
| 3 dB Transmitter Combiner | $0 | $3,500 |
| IBOC Audio Processor | $7,000 | $7,000 |
| Reject Load: | $0 | $0 |
| Outdoor Reject Load Installation Cost: | $0 | $0 |
| Total: | $128,000 | $131,500 |
| Estimated monthly power bill savings: | $152 | |
| Estimated monthly tube savings | $0 | |
| Total Estimated monthly savings: | $152 | Cost Payback in 24 Months |

Tube life is estimated to increase by approximately 60% due to reduced output power of the analog transmitter. Savings based on a typical $3,500 tube with normal full life of 36 months.

In Case 1, the cost of installation would be approximately $3,500 more for the Mid Level Combining method, however with an estimated $152 per month savings on the power bill, that extra cost would be recovered in about two years. There would be no savings on tube life since both methods use tubeless transmitters.

Case 2: Radio station operating at 15,000 Watts TPO.

Typically, a radio station like this would be operating a 20,000 Watt Main Transmitter. This would be sufficient for High Level Combining and no new analog transmitter would be necessary. A typical station would also have a back-up transmitter and a dummy test load capable of handling the full power, thus in Mid Level Combining, no additional "Reject" load will be necessary.

| | High Level | Mid Level |
|---|---|---|
| Analog Transmitter Cost: | $0 | $0 |
| Digital Transmitter Cost: | $75,000 | $88,000 |
| Digital Exciter Cost: | $33,000 | $33,000 |
| 10 dB High Level Combiner | $7,500 | $0 |
| 3 dB Transmitter Combiner | $0 | $3,500 |
| IBOC Audio Processor | $7,000 | $7,000 |
| Reject Load: | $5,000 | $0 |
| Outdoor Reject Load Installation Cost: | $2,500 | $0 |
| Total: | $130,000 | $131,500 |
| Estimated monthly power bill savings: | $642 | |
| Estimated monthly tube savings | $58 | |
| Total Estimated monthly savings: | $700 | Cost Payback in 3 Months |

Tube life is estimated to increase by approximately 60% due to reduced output power of the analog transmitter. Savings based on a typical $3,500 tube with normal full life of 36 months.

In Case 2, the cost of installation would be approximately $1,500 more for the Mid Level Combining method, however with an estimated $700/month savings between the power bill and increased tube life, the system would pay for itself in less than three months.

Case 3: Radio station operating at 25,000 Watts TPO with a Main Transmitter of 30,000. The wattage in Case 3 is enough to handle the increased power requirements for High Level Combining.

| | High Level | Mid Level |
|---|---|---|
| Analog Transmitter Cost: | $0 | $0 |
| Digital Transmitter Cost: | $88,000 | $88,000 |
| Digital Exciter Cost: | $33,000 | $33,000 |
| 10 dB High Level Combiner | $7,500 | $0 |
| 3 dB Transmitter Combiner | $0 | $3,500 |
| IBOC Audio Processor | $7,000 | $7,000 |
| Reject Load: | $5,000 | $0 |
| Outdoor Reject Load Installation Cost: | $2,500 | $0 |
| Total: | $143,000 | $131,500 |
| Estimated monthly power bill savings: | $678 | |
| Estimated monthly tube savings | $48 | |
| Total Estimated monthly savings: | $726 | |

Tube life is estimated to increase by approximately 50% due to reduced output power of the analog transmitter. Savings based on a typical $3,500 tube with normal full life of 24 months.

Case 3 not only saves the radio station $11,500 in installation costs, but would also see an immediate savings in the monthly operating costs making this method of combining the most economical over all.

Case 4: Radio station operating at 25,000 Watts TPO with a Main transmitter of 25,000 Watts.

In Case 4, the analog transmitter would be required to output close to 28,000 watts, which would require the purchase of a new Analog transmitter as well as a Digital transmitter. Since the output power level of the Analog transmitter in the Mid Level Combining Method is actually reduced, the radio station can continue to use its existing Analog transmitter, thus saving on the installation costs.

| | High Level | Mid Level |
|---|---|---|
| Analog Transmitter Cost: | $70,000 | $0 |
| Digital Transmitter Cost: | $88,000 | $88,000 |
| Digital Exciter Cost: | $33,000 | $33,000 |
| 10 dB High Level Combiner | $7,500 | $0 |
| 3 dB Transmitter Combiner | $0 | $3,500 |
| IBOC Audio Processor | $7,000 | $7,000 |
| Reject Load: | $5,000 | $0 |
| Outdoor Reject Load Installation Cost: | $2,500 | $0 |
| Total: | $213,000 | $131,500 |
| Estimated monthly power bill savings: | $678 | |
| Estimated monthly tube savings | $48 | |
| Total Estimated monthly savings: | $726 | |

Tube life is estimated to increase by 50% due to reduced output power of the analog transmitter. Savings based on a typical $3,500 tube with normal full life of 24 months.

Not only does the radio station save $81,500 in the installation costs, but it sees annual operating cost savings of over $8,700. Clearly the Mid Level Combining Method is a recommended option.

Case 5: Radio station operating at 35,000 Watts TPO with a Main transmitter of 35,000 Watts.

In Case 5, the main transmitter will not handle the needed analog power, nor can a single transmitter be purchased to handle this power. The radio station would now need to purchase a new analog transmitter to combine with the existing analog transmitter to make the necessary TPO of nearly 39,000 watts. For Mid Level combining, the Analog transmitter will be sufficient. On the Digital Transmitter Side, the station will have to purchase a dual solid state transmitter to produce the needed 3,500 watts of digital power, and an even higher power dual solid state transmitter for the 14,000 watts necessary, thus the installation costs for this power level are much higher over all.

| | High Level | Mid Level |
|---|---|---|
| Analog Transmitter Cost: | $85,000 | $0 |
| Digital Transmitter Cost: | $160,000 | $185,000 |
| Digital Exciter Cost: | $33,000 | $33,000 |
| 10 dB High Level Combiner | $7,500 | $0 |
| 3 dB Transmitter Combiner | $3,500 | $3,500 |
| IBOC Audio Processor | $7,000 | $7,000 |
| Reject Load: | $7,000 | $0 |
| Outdoor Reject Load Installation Cost: | $2,500 | $0 |
| Total: | $305,000 | $228,500 |
| Estimated monthly power bill savings: | $947 | |
| Estimated monthly tube savings | $94 | |
| Total Estimated monthly savings: | $1,041 | |

Tube life is estimated to increase by 50% due to reduced output power of the analog transmitter. Savings based on a typical $4,500 tube with normal full life of 16 months. In Case 5, there would be a savings of $77,000 to install the Mid Level Combining system over the High Level. It is important to note, however, that if the radio station has a back-up transmitter in excellent condition, it could combine that transmitter with the main transmitter and save $85,000 in cost. This would make the High Level Combining method $8,000 less expensive to install, however with the over $1,000 per month operating expense savings, the cost would be made up in less than eight months.

The present invention offers many advantages to the radio stations in transition from analog to digital broadcasting. The advantages include, and are not limited to, improving efficiency in generating high-definition radio signals by reducing power consumption; increasing tube life; saving on building space and transmitter room arrangements; saving on air-conditioning needs and costs. All of the above advantages are offered while customer satisfaction with the sound quality is met; digital AM radio will sound more like FM, and music broadcast on digital FM will sound more like a compact disk (CD).

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An efficient method of combining signals from a digital transmitter and an analog transmitter to produce a combined HD (High Definition) radio signal, comprising the steps of:
- providing a Linear Solid State IBOC transmitter with both digital and analog carriers output;
- providing a separate analog transmitter with an analog output, by
  - splitting an output from an analog exciter to an RF circulator and to a phase compensation circuit; and
  - feeding the output of the phase compensation circuit to the separate analog transmitter; and
  - combining the output of the RF circulator to an output from an IBOC exciter with a low level combiner; and
  - feeding the output of the low level combiner to the Linear Solid State IBOC transmitter; and
- combining the digital and analog carriers output of Linear Solid State IBOC transmitter through a combiner with the analog output of the separate analog transmitter.

2. The method of claim 1, wherein the combiner includes the step of: providing a 3 dB Hybrid combiner.

3. An efficient system for combining signals from it digital transmitter and an analog transmitter to produce a combined HD (High Definition) radio signal, comprising:
- a Linear Solid State IBOC transmitter that outputs both digital and analog carriers;
- a separate analog transmitter with an analog output; and
- a combiner for combining the digital and analog carriers output of the Linear Solid State IBOC transmitter with the analog output of the separate analog transmitter,
- a splitter for splitting an output from an analog exciter to an RF(radio frequency) circulator and to a phase compensation circuit, and feeding the output of the phase compensation circuit to the separate analog transmitter; and
- a combiner for combining the output of the RF circulator to an output from an IBOC exciter with a low level combiner and feeding the output of the low level combiner the Linear Solid State IBOC transmitter.

4. The system of claim 3, wherein the combiner includes: a 3 dB Hybrid combiner.

5. A method of combining signals from transmitters to produce a combined HD (High Definition) radio signal, comprising the steps of:
- providing first transmitter with both digital and analog carriers output;
- providing a second transmitter with an analog output, by
  - splitting an output from an analog exciter to an RF(radio frequency) circulator and to a phase compensation circuit; and
  - feeding the output of the phase compensation circuit to the second transmitter; and
  - combining the output of the RF(radio frequency) circulator to an output from an exciter with a low level combiner; and
  - feeding the output of the low level combiner to the First transmitter; and
- combining the digital and analog carriers output of the first transmitter through a combiner with the analog output or second transmitter, to generate an HD radio signal.

6. The method of claim 5, wherein the combiner includes the step of: providing a 3 dB Hybrid combiner.

7. A system for combining signals from a digital transmitter and an analog transmitter to produce a combined HD(High Definition) radio signal, comprising:

a first transmitter that outputs both digital and analog carriers;

a second transmitter with an analog output; and a combiner for combining the digital and analog carriers output of the first transmitter with the output of the second transmitter to generate an HD output;

a splitter for splitting an output from an analog exciter to an RF (radio frequency) circulator and to a phase compensation circuit, and feeding the output of the phase compensation circuit to the second transmitter; and a combiner for combining the output of the RF (radio frequency) circulator to an output from an exciter with a low level combiner and feeding the output of the low level combiner to the first transmitter.

8. The system of claim 7, wherein the combiner includes: a 3 dB Hybrid combiner.

9. A method of converting a radio station from analog transmission to digital transmission, comprising the steps of:

providing a first transmitter with both digital and analog carriers output;

providing a second transmitter with an analog output, by splitting an output from an analog exciter to an RF (radio frequency) circulator and to a phase compensation circuit; and feeding the output of the phase compensation circuit to the second transmitter; and combining the output of the RF (radio frequency) circulator to an output from an exciter with a low level combiner; and feeding the output of the low level combiner to the first transmitter; and combining the digital aid analog carriers output of the first transmitter through a combiner with the analog output of the second transmitter, to generate an 11D radio signal.

10. The method of claim 9, wherein the combiner includes the step of: providing a 3 dB Hybrid combiner.

11. A method of generating efficient high definition (HD) radio signals for radio stations with transmission power output (TPO) between approximately 5,000 watts and 35,000 watts while energy costs are lowered, comprising the steps of:

providing a first transmitter with both digit and analog carriers output;

providing a second transmitter with an analog output, by splitting an output from an analog exciter to an RF (radio frequency) circulator and to a phase compensation circuit; and feeding the output of the phase compensation circuit to the second transmitter; and combining the output of the RF (radio frequency) circulator to an output from an exciter with a low level combiner; and feeding the output of the low level combiner to the first transmitter; and combining the first transmitter through a combiner with the second transmitter without an additional reject load from either the first transmitter or the second transmitter, to generate an HD radio signal, wherein energy costs are lowered over existing methods of generating HD radio signals.

12. The method of claim 11, wherein the combiner includes the step of: providing a 3 dB Hybrid combiner.

* * * * *